United States Patent Office 2,995,412
Patented Aug. 8, 1961

2,995,412
PROCESS FOR DYEING AND PRINTING OF TEXTILE MATERIALS CONTAINING HYDROXYL GROUPS
Karl Gustav Kleb, Leverkusen, Germany, assignor to Farbenfabriken Bayer Aktiengesellschaft, Leverkusen, Germany, a corporation of Germany
No Drawing. Filed July 8, 1958, Ser. No. 747,113
11 Claims. (Cl. 8—54.2)

The present invention relates to a new process for dyeing and printing of textile materials containing hydroxyl groups.

In accordance with the invention it has been found that dyeings and prints of outstanding fastness to wet processing are obtainable on textile materials such as fibres, fabrics and the like containing hydroxyl groups, preferably on natural or regenerated cellulose, by applying to said materials dyestuffs free from sulfonic acid and carboxylic acid groups and containing in the molecule at least once the following grouping

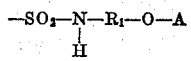

wherein $R_1$ denotes a hydrocarbon radical having two or three carbon atoms between N and O, and A denotes the radical of a polybasic inorganic acid or its organic derivatives, and subjecting the materials thus treated in the presence of acid-binding agents to the action of elevated temperatures. It is advantageous to follow up the fixing process by an after-treatment of the dyed or printed material in an aqueous neutral or alkaline bath.

The process can also be modified by first treating the materials to be dyed, with an acid-binding agent, and subsequently with the solution or paste of the dyestuff or by applying onto the material somultaneously the dyestuff solution or paste and the acid-binding agent.

The constitution of the compounds forming the dyestuff according to the invention may be very different. They may belong, for example, to the class of the azo, oxazine, dioxazine, triphenylmethane or anthraquinone dyestuffs or to that of the azororphin dyestuffs. The unesterified compounds contain in the molecule one or more sulfonic acid-β-hydroxyethylamide groups or sulfonic acid-γ-hydroxypropylamide groups which may be further substituted by alkyl radicals in the carbon chain. The dyestuff may contain substituents commonly used other than sulfonic acid and carboxylic acid groups. In general, those compounds are advantageously used which possess a very slight affinity for the materials to be dyed; the use of such dyestuffs enables the dyestuff molecule not firmly bound to the fibre to be stripped by subsequent after-treatment in an aqueous neutral or alkaline dyebath.

The dyestuffs to be used may be produced by, for example, combining sulfonic acid hydroxyalkylamides of preliminary dyestuff products, i.e. of diazo or azo components when using azo dyestuffs, to give the corresponding dyestuffs, or by producing sulfochlorides of dyestuffs, reacting these with alkanol amines, and converting in known manner the resultant dyestuff sulfonic acid-hydroxyalkylamides with dibasic or polybasic inorganic acids or their organic derivatives to give the corresponding esters. The esters of the dyestuffs substituted by sulfonic acid-hydroxyalkylamide groups may also be prepared by combining preliminary products which contain already sulfonic acid-hydroxyalkylamide groups esterified with the aforesaid acids; such preliminary products are, for example, sulfuric acid esters of aminoaryl sulfonic acid alkanolamides which are produced by reduction of the sulfuric acid esters of the corresponding nitroaryl sulfonic acid alkanolamides at temperatures up to 70° C. in aqueous or alcoholic medium. The esters are also obtainable by reacting the dyestuff sulfochloride with esters of amino alkanols.

The dyestuffs containing ester groups are isolated in the form of the alkali metal salts from a neutral to alkaline solution. They are stable at room temperature in a neutral or alkaline medium in substance or in solution.

They are generally used from an aqueous solution or paste which may be treated with alkaline compounds or acid-binding agents, preferably alkali metal hydroxide or alkali metal carbonate or with compounds changing into alkaline compounds such as alkali metal bicarbonate. The solution may contain further auxiliaries not reacting with the dyestuffs in an undesirable manner. Additives of said type are, for example, surface-active compounds such as alkyl sulfates, or substances or dyeing auxiliaries preventing the migration of the dyestuff such as alginates or polyacrylates or other thickeners such as oil-in-water emulsions. Especially, the addition of urea brings about a complete fixation of the dyestuff on the fibre.

The solutions or pastes thus obtained are applied to the material to be dyed by, for example, padding on the foulard, and subsequently heating to elevated temperatures of about 60–160° C., especially 90–140° C. for some time. This process may be carried out in the hotflue, steaming apparatus, on heated rollers or by the introduction into hot concentrated salt baths alone or consecutively in any sequence.

In an alternative mode of operation the acid or neutral dyestuff solution treated with the additives, may be applied to the dyeing material, which is intermediately dried and passed through concentrated salt baths preventing, to a large extent, the dyestuff removing from the fibre and containing alkaline compounds, preferably alkali metal carbonate or alkali metal hydroxide, and subsequently heated to higher temperatures. Heating may take place in the hotflue, or steaming apparatus by introducing the material into hot concentrated salt baths or by passing it through hot baths of liquid metal.

For carrying out printing processes, the dyestuff solution is worked up with a thickening agent and an alkaline compound or a compound splitting off alkalies upon heating, to give a printing paste which is fixed after the printing in the manner indicated above for dyeing, and rinsed.

After the fixation is completed, the dyeing material is rinsed in hot water and, if the further use requires, soaped at the boil in order to remove not sufficiently fixed dyestuff residues.

Dyeing and prints of excellent fastness to wet processing are thus obtained though the dyestuffs preferably used or their hydrolysis products possess only a slight affinity for the dyeing material.

When using azo dyestuffs containing the esterified sulfonic acid alkanolamide group in the diazo component, the dyed materials may be decolorized by reductive splitting of the azo bond on the dyestuffs applied, with, for example, sodium dithionite. When the material is subsequently treated first in an acid medium with a nitrite solution and then in an alkaline, neutral or acid range with the solution of the azo component used for the production of the original dyestuff, the dyestuff or the dyeing having the same fastness properties is formed back. This surprising result suggests that the dyestuff molecule is bound to the material to be dyed by a chemical bond.

*Example 1*

Nickel - phthalocyanine - (3) - tetrasulfo - hydroxyethylamide obtained by the reaction of nickel-phthalocyanine-(3)-tetrasulfochloride with four times its molar quantity of 2-amino-ethanol, is esterified according to known processes with sulfuric acid or benzoic acid sulfonylchloride or benzene sulfonylchloride. 4 grams of this dyestuff are dissolved in 100 millilitres of a solution containing 3 grams of sodium hydroxide, 5 grams of urea and 0.5 gram of sulfated castor oil (Turkey red oil). After the addition of 5 grams of a tragacanth solution containing 60 grams of tragacanth in 1000 grams of solution, the dyestuff solution is padded on to cotton poplin on the foulard, and the impregnated fabric immediately heated to 120° C. for 10 minutes. It is then rinsed in hot water and boiled with soap for 20 minutes. A level greenish blue dyeing is obtained having a very good fastness to washing and good fastness to brightening, to solvents and to light.

Example 2

Nickel-phthalocyanine-(3)-tetrasulfochloride is reacted in a weakly alkaline medium with an excess, i.e. with more than four times its molar quantity of 2-aminoethyl-sulfuric acid semi-ester. 4 grams of the dyestuff isolated by salting out with potassium chloride, are dissolved according to the instruction given in Example 1, fixed on a cotton fabric and then after-treated.

Example 3

The sulfochloride obtainable from the condensation product of 1 mol of 4-bromo-1'-methyl-anthrapyridone with 1 mol of 4-aminotoluene by treating with excess chlorosulfonic acid, is reacted with 2-amino-ethanol to give the corresponding sulfonic acid-$\beta$-hydroxyethylamide. By esterification with sulfuric acid, a dyestuff is obtained which is fixed on a cotton fabric according to the following method: The dyestuff is applied to cotton poplin in an aqueous solution to which are added per litre 100 grams of urea, 5 grams of sulfated castor oil and 20 grams of sodium hydroxide. The fabric thus treated is heated to 130° C. for at least 10 minutes, subsequently rinsed in hot water and boiled with soap. A bluish red dyeing of very good fastness to washing is obtained.

Example 4

By coupling of diazotized 1-amino-4-methylbenzene-3-sulfonic acid-$\beta$-hydroxyethylamide with 1-phenyl-3-methylpyrazolone-(5) and esterification of the monoazo dyestuff with sulfuric acid according to known processes, a yellow dyestuff is obtained which is applied by padding to copper staple fibre in a solution containing per litre 1 gram of dyestuff, 100 grams of urea, 5 grams of sulfated castor oil and 1.5 grams of sodium hydroxide. The impregnated material is heated to 100° C. for about 15 minutes, then rinsed and soaped. A yellow dyeing of very good fastness to wet processing is obtained.

The dyestuff used may also be obtained by coupling of the diazotized sulfuric acid ester of 1-amino-4-methyl-benzene-3-sulfonic acid-$\beta$-hydroxyethylamide with 1-phenyl-3-methylpyrazolone-(5) in an alkaline solution.

Instead of copper staple fibre there may also be used copper rayon, viscose rayon, viscose staple fibre, cotton or linen. The depth of shades are somewhat different according to the type of raw material used.

Example 5

The dyestuff obtainable by coupling of diazotized 1-amino-4-methylbenzene-3-sulfonic acid-$\beta$-hydroxyethylamide with 2-hydroxynaphthalene and subsequent esterification with sulfuric acid, or by coupling of diazotized sulfuric acid ester of 1-amino-4-methylbenzene-3-sulfonic acid-$\beta$-hydroxyethylamide with 2-hydroxynaphthalene, is fixed on a cotton fabric and after-treated according to the instruction given in Example 4. The resultant orange dyeing is very fast to washing and shows a very good fastness to brightening and to organic solvents.

Example 6

20 grams of the dyestuff obtained by condensation of copper phthalocyanine-(4)tetrasulfochloride with $\beta$-aminoethyl-hydrogen sulfate (sulfuric acid semi-ester of $\beta$-aminoethanol) in alkaline solution, are dissolved in 1000 millilitres of an aqueous solution containing 50 grams of urea, 5 grams of sulfated castor oil, 40 millilitres of sodium hydroxide solution (38° Bé.) and 50 grams of an alginate thickening 35:1000 or 50 grams of a 10 percent sodium polyacrylate solution. Bleached cotton calico is impregnated with this solution, the impregnated fabric dried at 80° C. and treated at 105° C. in a steaming apparatus for 5 minutes. After rinsing and boiling with soap, a greenish blue dyeing of an outstanding fastness to light and very good fastness to water, washing, boiling with sodium carbonate and to solvents is obtained.

Instead of sodium hydroxide there may be used in a similar manner and with similar result 30 grams of sodium carbonate, or sodium bicarbonate, or potassium carbonate or bicarbonate, or 20 grams of potassium hydroxide, or 30 grams of trisodium phosphate, or 20 grams of sodium silicate or 30 grams of cesium or lithium hydroxide or barium hydroxide.

Instead of calico, other fabrics of cotton, copper staple fibre or copper rayon, viscose staple fibre or viscose rayon or other cellulose fibres may be dyed in the same manner.

Example 7

Copper phthalocyanine (3) tetrasulfochloride obtained from copper phthalocyanine by heating with chlorosulfonic acid, is reacted in an aqueous alkaline solution with $\beta$-aminoethyl hydrogen sulfate. 30 grams of the isolated and dried dyestuff are dissolved in an aqueous solution containing 50 millilitres of sodium hydroxide solution (38° Bé.), 100 grams of urea, 5 grams of sulfated castor oil, stirred with 350 grams of an alginate thickening containing 30 grams of alkali metal alginate in 1000 grams of thickening or 400 grams of 10 percent sodium polyacrylate solution, and the paste thus obtained is made up with water to 1000 grams. Cotton fabric printed with this paste is dried at 80° C. annd steamed at 105° C. for 10 minutes in a steaming apparatus. After rinsing and soaping a greenish blue print of very good fastness to washing, solvents and light is obtained.

Prints on other fabrics of fibres of natural or regenerated cellulose yield similar results which differ somewhat, according to the type of fibre.

Example 8

4 grams of the dyestuff which may be obtained by coupling of diazotized 1-methyl-4-aminobenzene-3-sulfonic acid-(1'-hydroxy-2'-methyl-propylamide-[2]) with 2-hydroxynaphthalene and esterification of the aliphatic hydroxy group with sulfuric acid, is dissolved as described in Example 3 and applied to a cotton fabric. After a heat-treatment at 140° C. and after-treatment with rinsing and soaping, an orange dyeing is obtained.

Example 9

When a cotton fabric is treated in a similar manner to that indicated in Example 3 with a dyestuff obtained by coupling of diazotized 4-aminobenzene-1-sulfonic acid-(3'-hydroxypropylamide) with 2-hydroxynaphthalene and subsequent esterification with sulfuric acid, an orange dyeing fast to washing is obtained.

Example 10

Dyeings on fibres of natural or generated cellulose having very good fastness to water, boiling with sodium carbonate, washing, and to solvents are obtained by treating the fibres according to the instructions given in the preceding examples with dyestuffs obtained according to known processes by converting all the sulfonic acid groups of dyestuffs containing sulfonic acid groups and synthesized by the starting components listed in the following table, into the corresponding sulfonic acid-[β-hydroxy-ethylamides] esterified with sulfuric acid.

The conversion of the sulfonic acid groups of the dyestuffs or preliminary dyestuff products into sulfochloride groups is advantageously carried out by the action of chlorosulfonic acid and thionyl chloride. The sulfochlorides are isolated from the reaction mixture by treating with ice and reacted in an aqueous solution at a pH of 8 to 10 with, for example, β-aminoethyl-hydrogen-sulfate or γ-aminopropyl-hydrogen-sulfate. The final dyestuffs are mainly isolated by salting out with potassium chloride. In general, they are very readily water-soluble.

Starting azo dyestuffs obtained by coupling of:

| Diazo component | Coupling component | Dyeing on cellulose of the corresponding sulfonic acid β-hydroxy-ethylamides esterified with sulfuric acid |
|---|---|---|
| 4-aminobenzene-1-sulfonic acid | 1-[4'-sulfophenyl]-3-methyl-pyrazolone-(5) | Yellow. |
| 4-amino-1-methylbenzene-2-sulfonic acid | do | Do. |
| 3-aminobenzene-1-sulfonic acid | do | Do. |
| 3-amino-6-chlorobenzene-1-sulfonic acid | do | Do. |
| 3-aminobenzene-1-sulfonic acid | 1-[2'-chloro-5'-sulfophenyl]-3-methyl-pyrazolone-(5) | Do. |
| 4-aminobenzene-1-sulfonic acid | do | Do. |
| 4-amino-1-methylbenzene-2-sulfonic acid | do | Do. |
| Do | 1-[2',5'-dichloro-4'-sulfophenyl]-3-methyl-pyrazolone-(5) | Do. |
| Do | 1-[2'-methyl-6'-chloro-4'-sulfophenyl]-3-methyl-pyrazolone-(5) | Do. |
| 3-amino-6-chlorobenzene-1-sulfonic acid | do | Do. |
| 3-aminobenzene-1-sulfonic acid | 1-[4',8'-disulfonaphthyl-(2')]-3-methyl-pyrazolone-(5) | Do. |
| 2-amino-1-hydroxybenzene-4-sulfonic acid | do | Do. |
| 1-amino-4-methylbenzene-3-sulfonic acid | do | Do. |
| 2-aminobenzene-1-sulfonic acid | do | Do. |
| 4-aminobenzene-1-sulfonic acid | do | Do. |
| 2-amino-1-hydroxybenzene-4-sulfonic acid | 1-[2'-chloro-5'-sulfophenyl]-3-methyl-pyrazolone-(5) | Do. |
| Do | 1-[2',5'-dichloro-phenyl]-3-methyl-pyrazolone-(5) | Do. |
| 2-amino-4-chloro-1-hydroxybenzene-6-sulfonic acid | 1-phenyl-3-methyl-pyrazolone-(5) | Do. |
| 4-amino-1-methylbenzene-2-sulfonic acid | 1-hydroxynaphthalene-4-sulfonic acid | Red orange. |
| Do | 1-hydroxynaphthalene-5-sulfonic acid | Red. |
| Do | 1-hydroxynaphthalene-6-sulfonic acid | Red orange. |
| Do | 1-hydroxynaphthalene-7-sulfonic acid | Do. |
| Do | 1-hydroxynaphthalene-4,8-disulfonic acid | Red. |
| Do | 2-hydroxynaphthalene-3,6-disulfonic acid | Do. |
| Do | 2-hydroxynaphthalene-6-sulfonic acid | Red orange. |
| 4,4'-diaminodiphenyl-2,2'-disulfonic acid | do | Do. |
| Do | 1-hydroxynaphthalene-4-sulfonic acid | Do. |
| Do | 1-hydroxynaphthalene-5-sulfonic acid | Red. |
| 4,4'-diamino-3,3'-dichlorodiphenyl | 2-hydroxynaphthalene-3,6-disulfonic acid | Do. |
| Do | 1-hydroxynaphthalene-4,8-disulfonic acid | Do. |
| Do | 1-hydroxynaphthalene-3,6-disulfonic acid | Do. |
| 2-aminobenzene-1-sulfonic acid | 2-hydroxynaphthalene-6-sulfonic acid | Red orange. |
| 3-amino-4-methoxybenzene-1-sulfonic acid | do | Scarlet. |
| 2-amino-1-hydroxybenzene-4-sulfonic acid | do | Violet. |
| 3-amino-4-methoxybenzene-1-sulfonic acid | 1-(2'-hydroxy-3'-naphthoyl-amino)-2-methylbenzene-sulfonic acid | Red. |
| Do | 1-(2'-hydroxy-3'-naphthoyl-amino)-2-methyl-4-methoxy-benzene-sulfonic acid | Do. |
| 2,5-dichloro-4-aminobenzene-1-sulfonic acid | 1-(2'-hydroxy-3'-naphthoyl-amino)-2-methoxybenzene-sulfonic acid | Orange. |
| 3-chlor-4-aminobenzene-1-sulfonic acid | do | Do. |
| 2-aminonaphthalene-4,8-disulfonic acid | 3-amino-1-methylbenzene (dyestuff converted into urea) | Do. |
| 1-amino-8-hydroxy-naphthalene-3,6-disulfonic acid | 3-amino-4-methoxy-1-methylbenzene (dyestuff converted into urea) | Red. |
| 2-amino-1-hydroxy-4-chloronaphthalene-6-sulfonic acid | 1-(3-sulfophenyl)-3-methylpyrazolone-(5) (chrome complex of the dyestuff) | Do. |
| 1-amino-2-hydroxy-naphthalene-4-sulfonic acid | do | Bordo. |

| Diazo component | Further diazotised middle component | End coupling component | Dyeing of the end dyestuff on cellulose |
|---|---|---|---|
| 1-aminonaphthalene-5-sulfonic acid | 1-aminonaphthalene | 1-phenylaminonaphthalene-8-sulfonic acid | Brown. |
| 4,4-Di-[6''-methyl-benzothiazolyl-(2'')]-azobenzene-disulfonic acid | | | Yellow. |

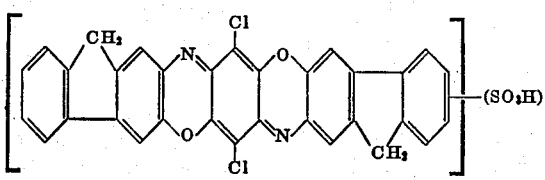

Violet.

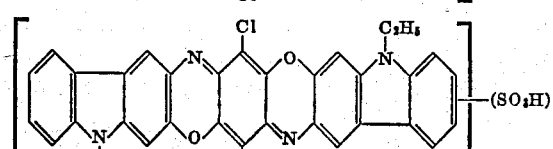

Blue.

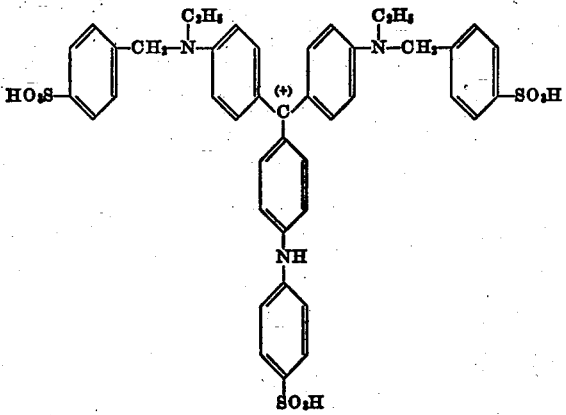

| | Dyeing on cellulose of the corresponding sulfonic acid β-hydroxyethyl-amides esterified with sulfuric acid |
|---|---|
| (structure) | Blue. |

Example 11

Dyeings on cellulose having likewise a very good fastness to washing are obtained by treating the dyeing material according to the instructions given in the preceding examples with dyestuffs which are obtainable from the following starting compounds:

Azo dyestuffs obtained by coupling of:

| Diazo component | Coupling component | Dyeing on cellulose |
|---|---|---|
| 3-aminobenzene-1-sulfonyl-aminoethyl hydrogen-sulfate. | 1-phenyl-3-methyl-pyrazolone-(5) | Yellow. |
| 5-aminobenzene-1,3-disulfonylamino-ethyl-hydrogensulfate. | ……do…… | Do. |
| Do. | 2-hydroxynaphthalene | Orange. |
| 2 mol 4-amino-1-methyl-benzene-2-sulfonyl-aminoethyl-hydrogen-sulfate. | 1 mol urea from 1-(3'-Aminophenyl)-3-methyl-pyrazolone-(5) | Yellow. |
| 2 mol 3-aminobenzene-1-sulfonylaminoethyl-hydrogensulfate. | ……do…… | Do. |
| 2 mol 2-amino-3-chloro-1-methylbenzene-5-sulfonyl-aminoethyl-hydrogensulfate. | ……do…… | Do. |
| 2 mol 4-amino-1-methyl-benzene-2-sulfonylamino-ethyl-hydrogensulfate. | 1 mol urea from 1-(4'-Aminophenyl)-3-methyl-pyrazolone-(5) | Do. |
| 2 mol 3-amino-4-methoxy-benzene-1-sulfonylamino-ethyl-hydrogensulfate. | ……do…… | Do. |
| 3-amino-4-methoxybenzene-1-sulfonylaminoethyl-hydrogensulfate. | 1-(2',3'-hydroxynaphthoyl-amino)-2-methylbenzene | Red. |
| Do. | ……do…… | Do. |
| Do. | 1-(2',3'-hydroxynaphthoyl-amino)-benzene | Do. |
| Do. | 1-(2',3'-hydroxynaphthoyl-amino)-4-chlorobenzene | Do. |
| Do. | 1-(2',3'-hydroxynaphthoyl-amino)-2,4-dimethoxybenzene | Do. |
| Do. | 1-(2',3'-hydroxynaphthoyl-amino)-2-methyl-4-methoxy-benzene | Do. |
| 2 mol 3-amino-4-methoxy-benzene-1-sulfonylamino-ethyl-hydrogensulfate. | 1 mol 1,4-terephthaloyl-bis-acetyl-(2'-methoxy-5'-methyl-4'-chloro-anilin) | Yellow. |
| Do. | 1 mol 1,4-terephthaloyl-bis-acetyl-(2',4'-dimethoxy-5'-chloro-anilin) | Do. |
| 4-amino-2,5-dichloro-benzene-1-sulfonylamino-ethyl-hydrogensulfate. | 1-(2',3'-hydroxycarbazoyl-amino)-4-chlorobenzene | Brown. |
| Do. | 1-(2',3'-hydroxynaphthoyl-amino)-2,5-dimethoxybenzene | Red. |
| 1,3-dimethyl-4-amino-benzene-5-sulfonylamino-ethyl-hydrogensulfate. | 1-(2',3'-hydroxynaphthoyl-amino)-4-methoxybenzene | Scarlet. |
| Do. | 1-(2',3'-hydroxy-carbazoyl-amino)-4-chlorobenzene | Brown. |
| 2-aminobenzene-1-sulfonylaminoethyl-hydrogensulfate. | 1-(2',3'-hydroxynaphthoyl-amino)-4-methoxybenzene | Scarlet. |
| 3-aminobenzene-1-sulfonyl-aminoethyl-hydrogensulfate. | ……do…… | Do. |
| 2,5-dichloro-4-amino-benzene-1-sulfonylamino-ethyl-hydrogensulfate. | ……do…… | Red. |
| 3-amino-4-methoxybenzene-1-sulfonylaminoethyl-hydrogensulfate. | ……do…… | Do. |
| 2-chloro-4-aminobenzene-1-sulfonylaminoethyl-hydrogensulfate. | ……do…… | Do. |
| 4,4'-bis-[3''-aminobenzene-1'''-sulfonamido]-diphenyl-2,2'-disulfonyl-aminoethyl-hydrogensulfate. | ……do…… | Scarlet. |
| 3-amino-4-methoxybenzene-1-sulfonylaminoethyl-hydrogensulfate. | 1-(2',3'-hydroxynaphthoyl-amino)-2-methoxybenzene | Red. |
| 2-amino-1-methylbenzene-3,5-di-(sulfonylamino-ethyl-hydrogensulfate). | ……do…… | Scarlet. |
| 3-amino-4-methylbenzoyl-[1'-aminonaphthalene-3',7'-di-(sulfonylaminoethyl-hydrogensulfate)]. | ……do…… | Red. |
| 2-amino-diphenylether-4,4'-di-[sulfonylamino-ethyl-hydrogensulfate]. | ……do…… | Do. |
| 2-amino-6-chloro-1-hydroxybenzene-4-sulfonylamino-ethyl-hydrogensulfate. | 1-phenyl-3-methyl-pyrazolone-(5) (dyestuff coppered at pH=5) | Orange |

COUPLING PRODUCTS CONVERTED INTO UREA FROM—

| | | |
|---|---|---|
| 2-amino-1-methylbenzene-4-sulfonylaminoethyl-hydrogensulfate. | 3-amino-1-methylbenzene | Yellow. |
| Do. | 3-amino-4-methoxy-1-methylbenzene | Do. |
| 2-aminonaphthalene-4,8-di-[sulfonylaminoethyl-hydrogensulfate]. | 3-amino-1-methylbenzene | Do. |
| Do. | 3-amino-4-methoxy-1-methylbenzene | Orange. |
| Do. | 3-acetamino-1-aminobenzene | Brick red. |

Example 12

Dyestuffs which may be used for the process claimed are also obtainable by converting the dyestuffs given in the following table by means of chlorosulfonic acid and thionyl chloride into the sulfochlorides and reacting them in an aqueous alkaline medium with 2-amino-ethyl-hydrogen sulfate.

Dyeings or prints of very good fastness to water, washing and boiling are obtained by treating materials of cellulose fibres with the following dyestuffs according to the instructions of the preceding examples.

Azo dyestuffs obtained by coupling of:

| Diazo component | Coupling component | Dyeing of the final dyestuff on cellulose-containing materials |
|---|---|---|
| 4-amino-1-methylbenzene | 1-phenyl-3-methyl-pyrazolone-(5). | Yellow. |
| 2-methoxy-1-aminobenzene | 1-(2',3'-hydroxy-naphthoyl-amino)-4-methoxybenzene. | Red. |
| 1-methoxy-2-aminobenzene-4-benzylsulfone. | 1-(2',3'-hydroxy-naphthoyl-amino)-2-methoxybenzene. | Do. |
| 2-methoxy-1-aminobenzene | do | Do. |
| Do | 1-(2',3'-hydroxy-naphthoyl-amino)-2-methyl-4-methoxy-benzene. | Do. |
| 1-methoxy-2-aminobenzene-4-benzylsulfone. | do | Do. |
| 2,5-dichloro-1-amino-benzene | 1-(2',3'-hydroxy-naphthoyl-amino)-benzene. | Brown red. |
| 3-aminobenzene-1-sulfonic acid | 1-(2',3'-hydroxy-naphthoyl-amino)-4-methoxybenzene. | Red. |
| 2-chloro-5-aminobenzene-1-sulfonic acid. | 1-(2',3'-hydroxy-naphthoyl-amino)-2-methoxybenzene. | Do. |
| 3-amino-4-methoxybenzene-1-sulfonic acid. | 1-(2',3'-hydroxy-naphthoyl-amino)-2,4-dimethoxy-5-chlorobenzene. | Do. |

| Dyestuff | Dyeing of the end product on cellulose-containing material |
|---|---|
| 4-phenylamino-1'-methyl-anthrapyridone | Yellowish red. |
| 4-(4'-methylphenylamino)-1-methyl-anthrapyridone | Bluish red. |
| 4-(3'-chlorophenylamino)-1-methyl-anthrapyridone | Yellowish red. |
| 4-(4'-benzyl-phenylamino)-1-methyl-anthrapyridone | Bluish red. |
| 6-(4'-methylphenylamino)-2-diphenyl-(4)-anthrapyrimidine. | Scarlet. |
| 6-(4'-benzyl-phenylamino)-2-diphenyl-(4)-anthrapyrimidine. | Red. |
| 1,4-di-(4'-methylphenylamino)-anthraquinone | Bluish green. |
| 1,4-di-(2',6'-dimethylphenylamino)-anthraquinone | Blue. |
| 1,4-di-(2'-methyl-6'-ethylphenylamino)-anthraquinone | Do. |
| 1,4-di-(2',6'-diethylphenylamino)-anthraquinone | Do. |
| 1,4-di-(2',6'-diethyl-4'-methylphenylamino)-anthraquinone. | Do. |
| 1,4-di-(2',4'-dimethyl-6'-ethylphenylamino)-anthraquinone. | Do. |
| 1,4-di-(2',4',6',-trimethyl-phenylamino)-anthraquinone | Do. |
| 1,4-di-(4'-methylphenylamino)-5-hydroxy-anthraquinone. | Green. |
| 1,4-di-(4'-methylphenylamino)-5,8-dihydroxy-anthraquinone. | Do. |
| 1,4-di-(4'-methylphenylamino)-6-chloro-anthraquinone | Do. |
| 1,4-di-(4',6'-dimethylphenylamino)-anthraquinone | Do. |
| 1,4-di-(4'-methylphenylamino)-7,8-dihydroxy-anthraquinone. | Do. |
| 2,7-Bis-diphenyl-(4)-[1':9'-4":10"]-anthra-dipyrimidine | Yellow brown. |

Example 13

Dyeings of good fastness to water, washing and solvents are obtained by treating materials of cellulose fibres according to the instructions of the preceding examples with azo dyestuffs which are obtainable by coupling of the following components:

| Diazo component | Coupling component | Dyeing on cellulose-containing materials |
|---|---|---|
| 2-aminobenzene-1-sulfonyl-aminoethyl-hydrogensulfate | 1-(2',3'-hydroxynaphthoyl-amino)-2-methoxybenzene-5-sulfonylaminoethyl-hydrogensulfate. | Red. |
| 4-amino-1-methylbenzene-2-sulfonylaminoethyl-hydrogensulfate | do | Do. |
| 3-aminobenzene-1-sulfonyl-aminoethyl-hydrogensulfate | do | Scarlet. |
| 3-amino-4-methoxybenzene-1-sulfonylaminoethyl-hydrogensulfate | do | Red. |
| 1,3-dimethyl-4-aminobenzene-5-sulfonylaminoethyl-hydrogensulfate | do | Scarlet. |
| 4-amino-1-methylbenzene-3,5-di-[sulfonylamino-ethyl-hydrogensulfate] | do | Do. |
| 2-aminobenzene-1-sulfonyl-aminoethyl-hydrogensulfate | 1-(2',3'-hydroxynaphthoyl-amino)-4-methylbenzene-5-sulfonylaminoethyl-hydrogensulfate. | Red orange. |
| 3-aminobenzene-1-sulfonyl-aminoethyl-hydrogensulfate | do | Do. |
| 4-amino-1-methylbenzene-2-sulfonylaminoethyl-hydrogensulfate | do | Scarlet. |
| 2-chloro-5-aminobenzene-1-sulfonylaminoethyl-hydrogensulfate | do | Do. |
| 1,3-dimethyl-4-aminobenzene-5-sulfonylaminoethyl-hydrogensulfate | do | Do. |
| 3-amino-4-methoxybenzene-1-sulfonylaminoethyl-hydrogensulfate | do | Red. |
| 4-amino-1-methylbenzene-3,5-di-[sulfonylamino-ethyl-hydrogensulfate] | do | Scarlet. |
| 2,3-dichloro-5-aminobenzene-1-sulfonylaminoethyl-hydrogensulfate | do | Do. |
| 2-chloro-4-amino-1-methyl-benzene-5-sulfonylamino-ethyl-hydrogensulfate | do | Do. |
| 4,4'-bis-[3''-aminobenzene-1''-sulfonamido]-diphenyl-2,2'-di-[sulfonylamino-ethyl-hydrogensulfate]. | do | Red orange. |

Copper complex compounds of azo dyestuffs from:

| Diazo component | Coupling component | Dyeing on cellulose-containing materials |
|---|---|---|
| 2-amino-6-chloro-1-hydroxybenzene-4-sulfonylaminoethyl-hydrogensulfate | 2-hydroxynaphthalene-6-sulfonylaminoethyl-hydrogensulfate. | Bordo. |
| 3-nitro-4-aminobenzene-1-sulfonylaminoethyl-hydrogensulfate (acid) / 2-amino-6-chloro-1-hydroxybenzene-4-sulfonylaminoethyl-hydrogensulfate (alkaline) | 1-amino-7-hydroxy-naphthalene | Black. |

Sometimes it may be advantageous to apply onto the material to be dyed or printed a mixture of two or more dyestuffs as used in the preceding examples; thus, a yellowish orange shade having very good fastness to wet processing is obtainable if a mixture of the second and third dyestuff listed in the Table of Example 11 is used.

Example 14

The coupling product from diazotized 3-aminobenzene-1-sulfonic acid and 1-(2'-chloro-5'-sulfophenyl)-3-methyl-5-pyrazolone is converted in accordance with the method described in Example 10 into the sulfonic acid-$\beta$-hydroxyethylamide esterified with sulfuric acid, and isolated as potassium salt. 20 grams of this dyestuff are dissolved in 1000 ml. of a solution which contains 100 g. of urea and 2 g. of sodium dodecyl-benzene-sulfonate. A cotton fabric is padded on the foulard with this solution and dried at 60° C. The fabric is again padded on a foulard with a solution containing 15% of potassium chloride and 4% of sodium carbonate, and subsequently passed for 6 minutes through a Wood's-alloy bath heated to 130° C. After rinsing and soaping at boiling temperature a yellowish dyeing of excellent fastness to washing is obtained.

Example 15

A cotton fabric is impregnated with a 1% sodium hydroxide solution, dried and treated with a solution containing per litre 20 g. of the dyestuff used in Example 14, 100 g. of urea and 1 g. of sodium-lauryl-sulfate; the fabric thus treated is heated to 120° C. for 10 minutes, then rinsed and soaped at boiling temperature. One obtains a yellowish dyeing of likewise excellent fastness to washing.

A yellow print can be produced on a cotton fabric when impregnating the fabric with a 1% soda lye and drying and then printing with a paste containing in 1000 g. 30 g. of the above mentioned dyestuff, 100 g. of urea and 400 g. of sodium polyacrylate; the fabric is then dried at 80° C. and the printed side heated to 130° C. for 5 minutes on a hot cylinder. The fabric is finally rinsed and boiling soaped.

I claim:

1. Process for the dyeing and printing of cellulose-containing textile materials which comprises applying to these materials dyestuffs free from sulfonic acid and carboxylic acid groups, and containing at least once the following grouping

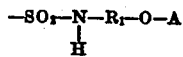

wherein $R_1$ represents an ethylene radical and A is a radical selected from the group consisting of a polybasic inorganic acid and its organic derivatives, and subjecting the material thus treated to the action of an elevated temperature of about 60 to 160° C. in the presence of acid-binding agents.

2. Process according to claim 1 which comprises fixing the dyestuff in the presence of urea.

3. Process according to claim 1 which comprises following up the fixation by an after-treatment in a neutral to alkaline aqueous bath.

4. Process according to claim 1 which comprises treating the material to be dyed first with an acid-binding agent and subsequently applying the dyestuff and fixing them by the action of an elevated temperature of about 60 to 160° C.

5. Process according to claim 4 which comprises fixing the dyestuff in the presence of urea.

6. Process according to claim 4 which comprises following up the fixation by an after-treatment in a neutral to alkaline aqueous bath.

7. Process according to claim 1 which comprises treating the material to be dyed simultaneously with an acid-binding agent and the dyestuff and fixing them by the action of an elevated temperature of about 60 to 160° C.

8. Process according to claim 7 which comprises fixing the dyestuff in the presence of urea.

9. Process according to claim 7 which comprises following up the fixation by an after-treatment in a neutral to alkaline bath.

10. The process of claim 1 wherein the acid binding agent is a member selected from the group consisting of sodium hydroxide, potassium hydroxide, sodium carbonate, potassium carbonate, sodium bicarbonate and potassium bicarbonate.

11. The process of claim 10 wherein the temperature is from 90 to 140° C.

References Cited in the file of this patent

UNITED STATES PATENTS 2,424,493    Muller    July 22, 1947
2,670,265    Heyna    Feb. 23, 1954

OTHER REFERENCES

Gilman: Organic Chemistry, John Wiley and Sons, N.Y., 2nd Ed., vol. 1, 1943, pp. 880–881, 901.

UNITED STATES PATENT OFFICE

CERTIFICATE OF CORRECTION

Patent No. 2,995,412                                            August 8, 1961

Karl Gustav Kleb

It is hereby certified that error appears in the above numbered patent requiring correction and that the said Letters Patent should read as corrected below.

Column 1, line 42, for "azororphin" read -- azaporphin --.

Signed and sealed this 6th day of March 1962.

(SEAL)
Attest:

ERNEST W. SWIDER                                                DAVID L. LADD
Attesting Officer                                                  Commissioner of Patents